July 7, 1925.
J. P. FOSTER
METHOD OF PURIFYING ETHER
Original Filed Nov. 29, 1920
1,544,569
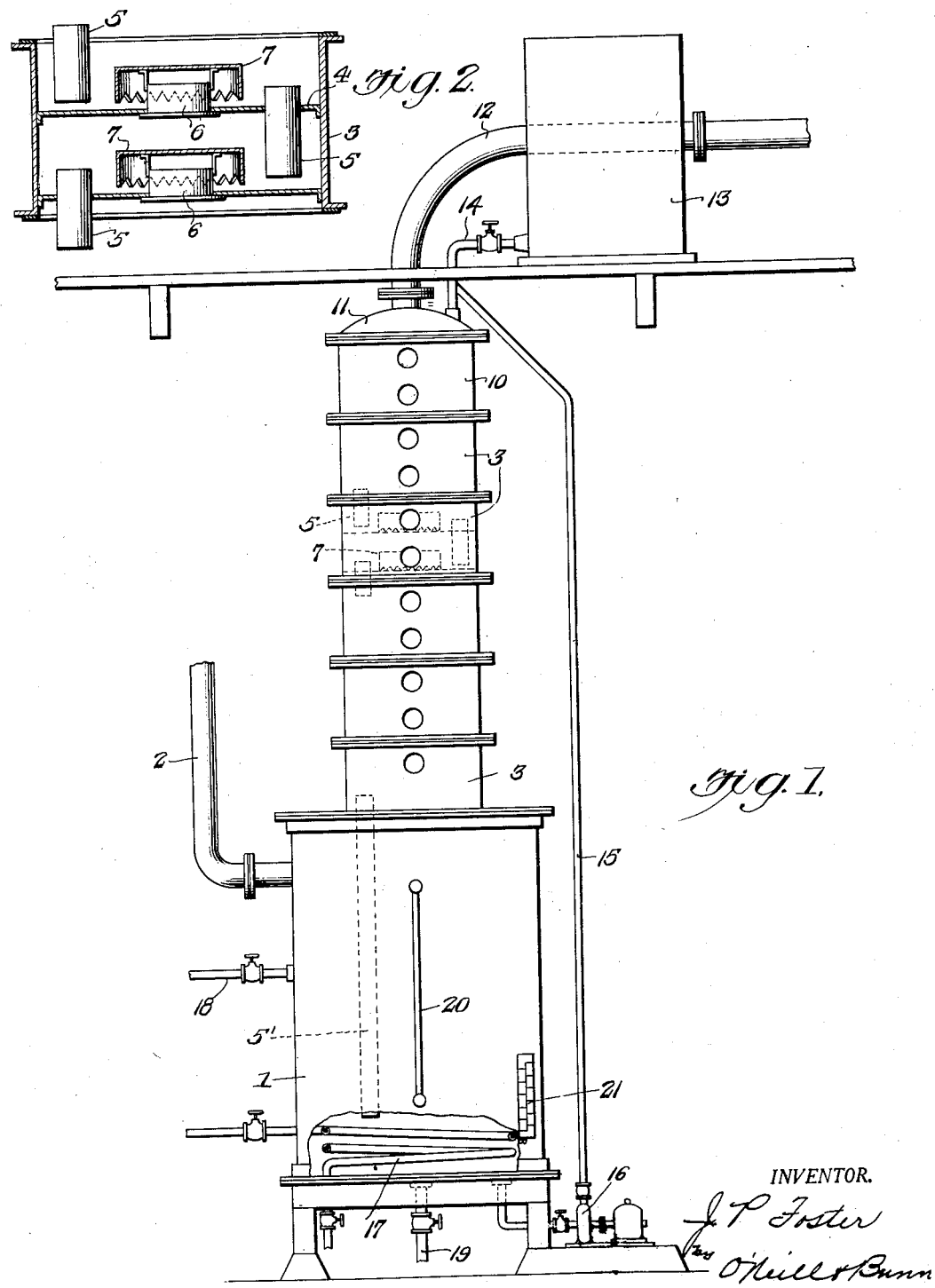
INVENTOR.
J. P. Foster
O'Neill & Bunn
ATTORNEYS.

Patented July 7, 1925.  1,544,569

UNITED STATES PATENT OFFICE.

JOHN P. FOSTER, OF PAIA, TERRITORY OF HAWAII.

METHOD OF PURIFYING ETHER.

Original application filed November 29, 1920, Serial No. 426,988. Divided and this application filed February 27, 1924. Serial No. 695,544.

*To all whom it may concern:*

Be it known that I, JOHN P. FOSTER, a citizen of the United States, residing at Paia, Maui, Territory of Hawaii, have invented certain new and useful Improvements in Methods of Purifying Ether; and I do hereby declare the following to be a full, clear, and exact description of the invention, such as will enable others skilled in the art to which it appertains to make and use the same.

The instant application, which is a division of my application Serial No. 426,988, filed November 29th, 1920, relates to a novel method of purifying ether and the like which comprises passing ether bearing vapors through a bath of a neutralizing agent, such as a solution of caustic soda heated to a temperature sufficient to vaporize the ether and to condense the other vaporous constituents, and maintaining a constant circulation of the solution through the bath in counter flow to the vapors; whereby the acidity of the ether will be neutralized and pure ether vapor will be obtained for subsequent condensation.

Suitable apparatus for carrying out the method is illustrated in the accompany drawings, in which:—

Fig. 1 is a vertical elevation, partly in section, of the scrubber and its accessories;

Fig. 2 is a vertical cross section of one of the scrubber sections.

Referring to the drawings, 1 indicates the base or reservoir section of a scrubber provided with a vapor inlet pipe 2 leading from the etherifier, or other source of vapor supply. Mounted upon the top of the reservoir 1 is a stack of scrubber trays or elements 3, which may be of the standard form illustrated in detail in Fig. 2, each tray being divided into two compartments by a cross partition 4, the successive compartments being connected by overflow pipes 5 which afford passage for the absorbing and neutralizing liquid from compartment to compartment throughout the series of trays, and regulate the depth of the liquid in each compartment, as will be understood. The bottom of each compartment is provided with a gas inlet pipe 6, centrally disposed therein and covered by a hood or cap 7 having a pendent serrated rim, which causes the vapors passing from one compartment to another to flow under the serrated rim of each cap and pass through the body of the liquid in the compartment. The top section of the scrubber is formed as the usual baffle chamber 10 and is provided with a cover plate 11, having connection with a discharge pipe 12 leading to a condenser, or other appropriate apparatus.

Mounted above the scrubber is a supply tank 13 containing the neutralizing and absorbing liquid, which in the present case is preferably a caustic soda solution, which is connected with the upper part of the scrubber by a valved pipe 14.

The scrubber is also provided with a by-pass 15 connected to the bottom of the reservoir section 1 and at the top of the scrubber, in which by-pass is interposed a suitable pump 16, which serves to maintain a continuous circulation of the liquid in the scrubber from the lower reservoir section of the latter through the pipe 15, thence downward through the several sections of the scrubber, thereby maintaining a constant level of liquid in the several compartments and also maintaining a constant flow of the liquid through the several compartments, from the top to the bottom of the scrubber, in a direction opposite to the flow of the vapors through the scrubber. The by-pass or conduit 15 forms with the scrubber a practically closed circuit for the circulation of the liquid. The lowermost section 3 of the scrubber is connected with the reservoir 1 by a dip pipe 5'.

Located in the bottom of the reservoir section is a steam coil 17 which may receive its supply of steam from any available source, preferably from the tail pipe of the ether still or other apparatus in which steam is similarly employed.

The reservoir section is also provided with a valved bleeder pipe 18 and a valved washout pipe 19, the purpose of which are obvious. The reservoir section is likewise provided with gauge glass 20 by means of which the depth of the liquid therein may be determined, and a thermometer 21 which will indicate the temperature of the circulating liquid.

The apparatus as described is particularly adapted to the purification of ether, produced by the acid process. According to the usual practice in the manufacture of ether by the acid process, the vapors from the ether still or etherifier are highly acid in their reaction, and, in order to remove the acid and neutralize the vapors, it is customary to pass them through a scrubber, in which the vapors are caused to bubble through a solution of caustic soda. In the scrubber commonly employed for this purpose, the vapors enter the lower reservoir section of the scrubber by the usual vapor pipe 2 and leave the scrubber by the exhaust pipe 12 leading to the condenser. The scrubber column comprises a series of trays or sections, constructed and arranged as illustrated, each of which trays contains a solution of caustic soda, or an equivalent neutralizing liquid, the depth of which is regulated by the pipes 5 connecting the successive trays and sections, through which liquid the vapors are caused to pass in their upward movement through the scrubber. The intended result of passing the vapors through the caustic soda solution is to purify them by the removal of the acid. What actually occurs in the scrubber as heretofore employed in this particular art is that the highly acid vapors of ether and water entering the scrubber by the vapor pipe 2 begin to lose their heat, and as they pass successively through the soda solution in the superposed trays of the scrubber, a considerable proportion of the ether and a large proportion of the water vapors are condensed. The mixture of ether and water, condensed in the trays, dilutes the soda solution in the trays, causes the trays to overflow, and the surplus liquid flows from tray to tray and ultimately reaches the reservoir section 1. Thus the solution in the trays quickly loses its alkalinity, not only by absorbing the acid from the vapors, but also by reason of the dilution of the solution by the water and ether condensing in the trays, so that the solution in the trays becomes acid in its reaction and no longer removes the acid from the vapors. Thus the scrubber fails to subserve its intended and normal purpose, namely, to neutralize the acid contents of the vapors, and becomes, in effect, only a condenser, wherein a portion of the ether vapors are condensed. The ether thus condensed ultimately reaches the lower reservoir section and becomes admixed with the liquid therein, and is either lost or is recovered with difficulty.

The present invention is designed to overcome these difficulties and to provide a process for recovering practically the entire ether content of the vapors delivered to the scrubber in a pure form and completely freed from acidity and contaminating water.

In the normal operation of the apparatus as described the reservoir section 1 is filled about half full with caustic soda solution, and the several trays are supplied from the reservoir 13 with soda solution, the depth of which in the several compartments is regulated by the connecting pipes 5. Steam is admitted to the coil 17 in the bottom of the reservoir section 1 in sufficient amount to heat the soda solution therein to about 180 degrees Fahrenheit. The pump 16 is started, which causes the heated soda solution to circulate through the scrubber from the top to the bottom thereof, the solution continuously overflowing the ends of the connecting pipes between the scrubber sections or trays and maintaining a uniform depth of soda solution in the trays. The vapors from the still or etherifier enter the upper part of the reservoir section 1 by the vapor pipe 2 and pass upward through the several trays of the scrubber and are caused to bubble through the caustic soda solution in each of the trays which effectively frees the vapors from all acidity. The trays are thereby kept full of fresh, hot caustic solution, at a temperature sufficient to prevent any condensation of the ether vapors, but not materially affecting the condensation of the water vapors, which are taken up by the caustic solution. The solution in the trays will therefore serve its normal purpose of neutralizing the acidity of the ether vapors and condensing the water vapors so long as the solution remains alkaline. The condensed water will dilute the solution circulating through the scrubber, and the surplus solution must be withdrawn from time to time through the bleeder pipe 18. The solution will absorb an appreciable portion of the vapor, which might escape should the solution be open to the external air at any time during its circulation through the apparatus. To prevent this loss, the conduit or by-pass 15 with the scrubber forms a closed circuit for the solution, so that the latter is at no time exposed to the external air. The solution should be tested frequently and its alkalinity maintained by additions of caustic soda to the scrubber from the lye tank 13, or other suitable source of supply, or, in the alternative, when the caustic solution becomes practically exhausted it is replaced in toto by a fresh solution, the exhausted solution being first drained from the reservoir 1 through the washout pipe 19. The ether will be delivered from the scrubber, by the exhaust pipe 12 to the condenser, completely purified from acid, freed from water vapor, and the loss of ether in the soda solution will be practically eliminated. Furthermore, by using the exhaust steam from the tail pipe of the still or etherifier, which is sufficient to maintain the desired temperature of 180 degrees Fahrenheit in the circulating caustic soda solution, no additional expense for heating the caustic solution will be involved.

What I claim is:

1. In the manufacture of ether, the method which comprises establishing a series of superposed bodies of hot neutralizing solution, maintaining a continuous closed circulation of said solution from each body to the next lower in the series and from the lowermost back to the highest body, passing ether bearing vapors in counter-current through the bodies of said solution, and maintaining the temperature of said solution sufficient to volatilize the ether and condense the other vaporous constituents.

2. The method of purifying ether which comprises passing ether bearing vapors through successive bodies of neutralizing solution maintained at a temperature sufficient to volatilize the ether and condense the other vaporous constituents, and maintaining a constant closed circulation of said solution in counter-flow to said vapors.

3. The method of purifying ether, which comprises heating a body of neutralizing solution to a temperature approximating 180 degrees Fahrenheit, maintaining a continuous closed circulation of said solution through a series of superposed scrubber units, passing ether bearing vapors in counter-current through the successive bodies of the solution in said units, and removing and condensing the ether vapor.

4. The method of purifying ether, which comprises maintaining a continuous circulation of an alkaline solution in a closed circuit, including a series of successive baths, heating the circulating solution to approximately 180 degrees Fahrenheit, passing ether bearing vapors in counter-current through said baths, and removing and condensing the ether vapor.

5. The method of purifying ether, which comprises maintaining a continuous circulation of a solution of caustic soda in a closed circuit, including a series of successive baths, heating the circulating solution to approximately 180 degrees Fahrenheit, passing ether bearing vapors in counter-current through said baths, and removing and condensing the ether vapor.

In testimony whereof I affix my signature.

JOHN P. FOSTER.